3,046,300
α-TRIFLUOROMETHYLOXYPHENYLALANINES
Meyer Sletzinger, North Plainfield, and Walter A. Gaines, Rahway, N.J., assignors to Merck & Co., Inc., Rahway, N.J., a corporation of New Jersey
No Drawing. Filed Oct. 21, 1960, Ser. No. 63,962
12 Claims. (Cl. 260—471)

This invention relates to new amino acids. More specifically, this invention relates to new amino acids of the formula

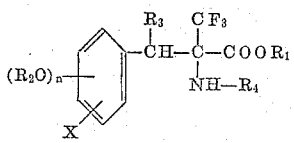

in which $R_1$ and $R_3$ each may be hydrogen or lower alkyl, $R_2$ and $R_4$ may each be hydrogen or lower alkanoyl, $R_4$ being hydrogen when $R_2$ is hydrogen, $n$ may be 1, 2, or 3, and X may be hydrogen, halogen, alkyl or trifluoromethyl, X being para to the amino acid side chain when it is other than hydrogen.

α-Methyl-β-dihydroxyphenylalanine and a number of compounds related thereto are becoming increasingly important in suppressing hypertension. These compounds appear to act physiologically as anti-metabolites by inhibiting the action of mammalian decarboxylase and by reducing the amount of norepinephrine found in both the heart and in the brain. It is not known which of these activities is the most important one in the reduction of hypertension. There is a need for reagents which are more selective so that a specific desired action can be obtained without the side effects. Especially, there is a need for reagents which do not reduce the norepinephrine in the brain while still having other effects, since there is evidence to indicate that certain psychic side effects such as mental depression may be connected with this biochemical activity in the brain.

We have found that α-trifluoromethyl-β-mono, di and trihydroxyphenylalanines and their lower alkyl esters and lower alkanoyl derivatives are very specific in their physiological activity in vivo. These compounds reduce the norepinephrine to be found in the heart but have no effect on that to be found in the brain. Further, while they appear in vitro to be active as inhibitors of mammalian decarboxylase they do not appear to have this activity in vivo.

It is a very surprising phenomenon to find that the replacement of the hydrogens on the α-methyl group by fluorine has this effect of pinpointing the physiological activity in vivo to the reduction of the norepinephrine content of the heart. There is no reason to predict such activity which permits one to use a specific effect, namely the reduction of norepinephrine without affecting the brain or inhibiting decarboxylase.

These compounds can also be utilized as intermediates in the preparation of norepinephrine-like compounds. Such compounds can be prepared by decarboxylation of the amino acid followed by hydroxylation on the β-carbon of the resulting amine. The decarboxylation can be carried out by the use of an enzyme catalyst (e.g., mammalian decarboxylase is readily obtainable by evaporation of the aqueous extract of ground hog or beef kidney or liver). The amino acid is heated at 37° C. with the enzyme and the coenzyme pyridoxylphosphate in an aqueous medium, buffered at a pH of 6.8, to give the corresponding amine. Hydroxylation of the β-carbon can be achieved by several routes. One is an enzymatic conversion by heating in a pH 6.8 buffered aqueous medium in the presence of slices of mammalian liver (beef or hog, e.g.). Such a method is shown by Senoh et al., J. Am. Chem. Soc. 81, 6236 (1959). Another is by the chemical method of Senoh and Withop, J. Am. Chem. Soc., 81, 6222 (1959). The resulting products are related to norepinephrine in the same way that the amino-acids are related to dihydroxyphenylalanine. Compounds of the structure of the nor-epinephrine type are known to have utility as pressor agents and the compounds of this invention are thus valuable intermediates in the preparation of such compounds.

In the preparation of the compounds of our invention, the starting materials are hydroxylated phenyl-trifluoroacetones and their derivatives. These are generally prepared by the procedure shown in the schematic Flow Sheet 1. A hydroxyphenylacetonitrile is condensed with trifluoroethyl acetate and sodium ethylate to give a cyanotrifluoro ketone. If a further substituent on the β-carbon is desired, this can be introduced at this point by the further condensation of the intermediate with sodium ethylate and an alkyl iodide. In the schematic Flow Sheet I, the symbol $R_3$ is used to indicate that this β substituent may be either a hydrogen or a lower alkyl group. The intermediate is then subjected to acid hydrolysis either in two steps, through an amide, or in one step, at a higher temperature, to give cleavage to form the hydroxylphenyltrifluoro ketone. The methoxyls on the phenol group which eventually will be hydrolyzed into the hydroxyl in the phenol product may number 1, 2, or 3 and be in any desired configuration. The halogen, alkyl or trifluoromethyl substituent, which may also be present on the ring, must be para to the acetone side chain and when they are present a 4-methoxyl is, of course, excluded.

(I) PREPARATION OF STARTING KETONE

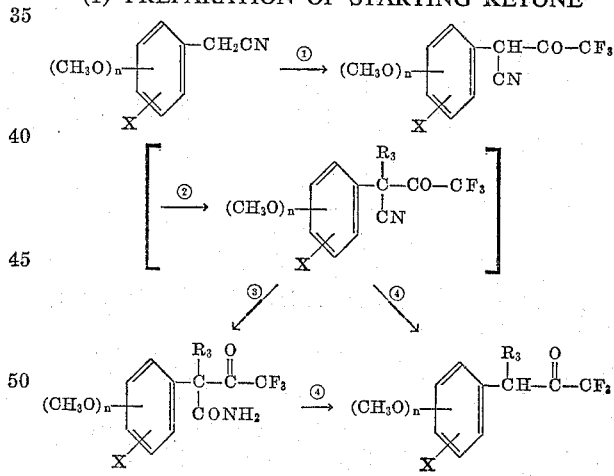

Definition:
 $R_3$=H or lower alkyl
 X=H, halogen, alkyl, trifluoromethyl, para to side chain when other than H
Reagents:
 ① $CF_3COOC_2H_5+NaOC_2H_5$
 ② $R_3I+NaOC_2H_5$
 ③ 72% $H_2SO_4$ at 90° C.
 ④ 61% $H_2SO_4$ at 115–120° C.

The products of our invention are synthesized readily by condensation of the starting ketone with ammonium carbonate and potassium cyanide to form a hydantoin derivative which upon hydrolysis with hydrobromic acid forms the α-trifluoromethylalanine derivative and simultaneously cleaves the methoxy group to form the hydroxylate phenol end of the molecule. When such are desired, the hydroxyphenoltrifluoromethylalanine can be esterified with a lower alkanol. Acyloxy and acylamido derivatives are prepared, if desired, by acylation with acyl halides or anhydrides. These reactions are shown in schematic Flow Sheet II, in which the symbols $R_1$ and $R_2$ are used to indicate only lower alkyl or lower alkanoyl respectively, although in the general formula above and in the claims, they represent the alternative free hydrogen as well.

(II) PREPARATION OF α-$CF_3$ ACIDS, ETC.

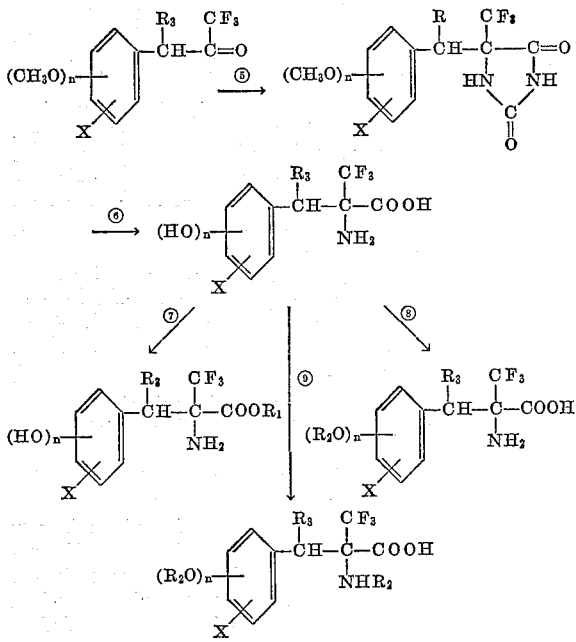

Definitions:
$R_1$=lower alkyl
$R_2$=lower alkanoyl
$R_3$=lower alkyl or hydrogen
X=H, halogen, alkyl, $CF_3$, para to the side chain when not H Reagents:
⑤ $(NH_4)_2CO_3$+KCN
⑥ 48% HBr
⑦ $R_1OH$+mineral acid
⑧ $R_2Cl$ or $(R_2)_2O$ in dilute NaOH
⑨ $(R_2)_2O$+pyridine under $N_2$ Thus, the compounds of our invention include, among others, the following:

α-Trifluoromethyl-β-4-chloro-3-hydroxyphenylalanine
α-Trifluoromethyl-β-4-methyl-3-hydroxyphenylalanine
α-Trifluoromethyl-β-4-ethyl-3-hydroxyphenylalanine
α-Trifluoromethyl-β-4-propyl-3-hydroxyphenylalanine
α-Trifluoromethyl-β-4-trifluoromethyl-3-hydroxyphenylalanine
α-Trifluoromethyl-β-3-hydroxyphenylalanine
α-Trifluoromethyl-β-4-hydroxyphenylalanine
α-Trifluoromethyl-β-3,4-dihydroxyphenylalanine
α-Trifluoromethyl-β-2,3-dihydroxyphenylalanine
α-Trifluoromethyl-β-4-chloro-3,5-dihydroxyphenylalanine
α-Trifluoromethyl-β-4-methyl-3,5-dihydroxyphenylalanine
α-Trifluoromethyl-β-4-trifluoromethyl-3,5-dihydroxyphenylalanine
α-Trifluoromethyl-β-3,4,5-trihydroxyphenylalanine
α-Trifluoromethyl-β-2,3,4-trihydroxyphenylalanine
α-Trifluoromethyl-β-2,3,5-trihydroxyphenylalanine
α-Trifluoromethyl-β-4-chloro-2,3,5-trihydroxyphenylalanine
α-Trifluoromethyl-β-4-methyl-2,3,5-trihydroxyphenylalanine
α-Trifluoromethyl-β-methyl-β-3-hydroxyphenylalanine
α-Trifluoromethyl-β-methyl-β-4-chloro-3-hydroxyphenylalanine
α-Trifluoromethyl-β-methyl-β-4-methyl-3-hydroxyphenylalanine
α-Trifluoromethyl-β-methyl-β-4-hydroxyphenylalanine
α-Trifluoromethyl-β-methyl-β-3,4-dihydroxyphenylalanine
α-Trifluoromethyl-β-methyl-β-2,3-dihydroxyphenylalanine
α-Trifluoromethyl-β-methyl-β-3,4,5-trihydroxyphenylalanine
α-Trifluoromethyl-β-methyl-β-2,3,4-trihydroxyphenylalanine
α-Trifluoromethyl-β-ethyl-β-3-hydroxyphenylalanine
α-Trifluoromethyl-β-ethyl-β-4-hydroxyphenylalanine
α-Trifluoromethyl-β-ethyl-β-3,4-dihydroxyphenylalanine
α-Trifluoromethyl-β-ethyl-β-2,3-dihydroxyphenylalanine
α-Trifluoromethyl-β-ethyl-β-3,4,5-trihydroxyphenylalanine
α-Trifluoromethyl-β-ethyl-β-2,3,4-trihydroxyphenylalanine
α-Trifluoromethyl-β-butyl-β-3-hydroxyphenylalanine
α-Trifluoromethyl-β-butyl-β-4-hydroxyphenylalanine
α-Trifluoromethyl-β-butyl-β-3,4-dihydroxyphenylalanine
α-Trifluoromethyl-β-butyl-β-2,3-dihydroxyphenylalanine
α-Trifluoromethyl-β-butyl-β-3,4,5-trihydroxyphenylalanine
α-Trifluoromethyl-β-butyl-β-2,3,4-trihydroxyphenylalanine
α-Trifluoromethyl-β-3-acetoxyphenylalanine
α-Trifluoromethyl-β-4-acetoxyphenylalanine
α-Trifluoromethyl-β-3,4-diacetoxyphenylalanine
α-Trifluoromethyl-β-2,3-diacetoxyphenylalanine
α-Trifluoromethyl-β-3,4,5-triacetoxyphenylalanine
α-Trifluoromethyl-β-2,3,4-triacetoxyphenylalanine
α-Trifluoromethyl-β-3-hydroxy-4,5-diacetoxyphenylalanine
N-acetyl-α-trifluoromethyl-β-3-acetoxyphenylalanine
N-acetyl-α-trifluoromethyl-β-3,4-diacetoxyphenylalanine and the methyl, ethyl, butyl and amyl esters of these various acids.

The esters and alkanoyl derivatives of these compounds are especially useful in that one obtains much better absorption of the compounds into the organism and much more prolonged activity with smaller and less frequent dosages. These compounds can be used in the form of non-toxic salts such as the hydrobromide, hydrochloride, sulfate and the like. These salts are water soluble and, in the case of the esters, are formed during their preparation.

The free esters are readily prepared by basification of these salts. The esters are prepared by esterification with a lower alkanol in the presence of a mineral acid such as hydrobromic, hydrochloric and the like. The alkanoyl derivatives are prepared by one of two methods.

When acylation of the ring hydroxyls only is desired, the reaction is carried out by a Schotten-Bauman reaction in which the hydroxyphenylalanine derivative is dissolved in dilute sodium hydroxide or other convenient basic material, and the desired alkanoyl chloride or alkanoic anhydride is added gradually with vigorous agitation, keeping the mixture cold. The amount of base is controlled to be equivalent to 80–100% of the acid and potential acid (i.e., the anhydride or halide) used, with the aim of having a pH of 6–8 at the end of the reaction. When acylation of the α-amino nitrogen is desired as well, more drastic conditions are needed. The process is then carried out by heating the hydroxyphenylalanine derivative in pyridine with the desired alkanoic anhydride.

In their use in living organisms such as in the treatment of hypertension, the free acids among the compounds of our invention are given in dosages of 1.0 to 25 g. per day orally. Preferably, they are used in the range of 5–10 g. per day, often in frequent small doses. In the case of the esters and the acyl derivatives of the compounds of our invention, the dosage range is normally of the order of 0.5 to 10 g. per day, preferably in the range of 2–5 g. These compounds of our invention can be mixed with any of the conventional ingredients for tablets or with the various known carriers for parenteral application.

Our invention can be illustrated by the following examples:

Example 1

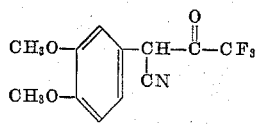

10.7 g. of sodium is dissolved in 127 ml. of absolute alcohol. To the mixture is added 74.5 g. of 3,4-dimethoxyphenylacetonitrile and 65.5 g. of ethyl trifluoroacetate. The reaction mixture is heated at reflux for 16 hours and then cooled. It is then poured into 2500 ml. of water and the mixture is acidified to a pH of 2 with concentrated hydrochloric acid. The reaction mixture is then extracted 3 times with 250 ml. portions of ether. The extracts are washed twice with 200 ml. portions of water and then dried and concentrated in vacuo to a reddish oil. The addition of 100 ml. of benzene gives the white crystalline product.

The corresponding isomeric dimethoxyphenyl compounds are obtained when 2,3-dimethoxyphenylacetonitrile and 2,4-dimethoxyphenylacetonitrile are used in place of the 3,4-isomer.

Example 2

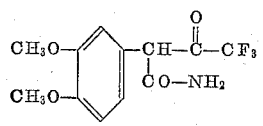

To a mixture of 440 ml. of sulfuric acid in 105 ml. of water is added gradually 169 g. of the product of Example 1 while keeping the temperature at 0–5° C. The mixture is then heated to 80° for 10 minutes and then cooled to 0°. It is then diluted at 0–5° C. with 1500–1600 ml. of water. The mixture is then heated at 90° for 3 hours and again cooled to 5°. The solid product is isolated by filtration, washed with ethanol and then with ether to give the amide of the above structure. A further crop of the product can be obtained by concentration of the mother liquors.

When the isomeric dimethoxyphenyl products of Example 1 are used in place of the product of Example 1, the corresponding isomeric amides are obtained.

Example 3

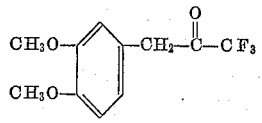

To a mixture of 63 ml. of sulfuric acid and 41 ml. of water there is added 36 g. of the product of Example 2. The mixture is heated at 115–120° for two hours after which the reaction mixture is cooled to 10°. It is then poured into 200 ml. of ice water and the product is extracted with three successive 100 ml. batches of ether. The extracts are washed free of acid with water, dried and concentrated in vacuo to give the pale brown oil which is the product of the above structure.

When the isomeric methoxy compounds of Example 2 are used in this procedure, in place of the main product of Example 2, the corresponding isomeric methoxyphenyl ketones are obtained, specifically, 1,1,1-trifluoro-3-(2,3-dimethoxyphenylacetone) and 1,1,1-trifluoro-3-(2,4-dimethoxyphenylacetone).

Example 4

To a mixture of 19 ml. of sulfuric acid in 12 ml. of water, there is added 10 g. of the product of Example 1. The mixture is heated at 115–120° for two hours. The reaction mixture is then cooled and poured into 50 ml. of ice water. The product is extracted with three successive 25 ml. batches of ether. The extracts are washed free of acid, dried and concentrated in vacuo to yield a product identical with the product of Example 3.

Example 5

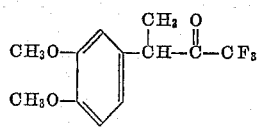

32.5 g. of sodium methylate is added slowly to 74.5 g. of the product of Example 3 with vigorous stirring in a nitrogen atmosphere. There is then added 127.8 g. of methyl iodide, rapidly with cooling and efficient refluxing. The reaction mixture is heated at reflux until the reaction is substantially complete and then cooled and stirred at room temperature overnight. The methyl iodide is removed by evaporation and 100 ml. of water is added. The product is extracted from the solution with successive batches of ether. The ether extracts are washed with sodium thiosulfate solution, water, saturated brine, and dried over magnesium sulfate and concentrated in vacuo. The residue is distilled to yield the 1,1,1-trifluoro-3-(4-dimethoxyphenyl)-butanone 2.

When the isomeric dimethoxyphenyl ketones of Example 3 are used in the above procedure in place of the main product of Example 1, the corresponding isomeric ketones are obtained.

When equivalent quantities of ethyl iodide, propyl iodide and butyl iodide are used in place of the methyl iodide in the above procedure, the corresponding pentanone, hexanone and heptanone are obtained.

Example 6

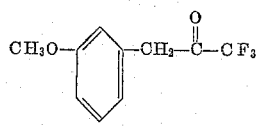

The procedures of Examples 1, 2 and 3 are followed with an equivalent quantity of 3-methoxyphenyl-acetonitrile used in place of the dimethoxyphenylacetonitrile in Example 1. The product is the methoxyphenyl-ketone of the above structure, namely 1,1,1-trifluoro-3-(3-methoxyphenyl)-propanone.

When the procedure of Example 5 is followed using an equivalent quantity of the above monomethoxyphenyl trifluoroacetone in place of the dimethoxyphenyl acetone of Example 3, the corresponding 1,1,1-trifluoro-3-(monomethoxyphenyl)-butanone 2 is obtained. Similarly, when simultaneously an equivalent quantity of ethyl iodide or propyl iodide is used in place of the methyl iodide, the corresponding pentanone and hexanone are obtained.

When the procedures of Examples 1, 2 and 3 are followed, using in the procedure of Example 1, in place of the dimethoxyphenylacetonitrile, an equivalent quantity of 4-chloro-3-methoxyphenylacetonitrile (preparable from 4-chloro-3-methoxybenzaldehyde by reduction of the aldehyde group to a carbinol group with sodium borohydride (J.A.C.S., 71, 122 (1949)) followed by replacement of the alcohol group by chlorine by reaction with HCl and replacement of the chlorine with CN by reaction with KCN), 4-bromo-3-methoxy-phenyl acetonitrile (preparable similarly from 4-bromo-3-methoxy benzaldehyde), 4-iodo-3-methoxybenzaldehyde (preparable from 4-nitro-3-hydroxybenzaldehyde by methylation of the hydroxy with dimethylsulfate, reduction of the nitro by $Na_2S$, diazotization of the resulting amino and decomposition of the diazo with potassium iodide to give 4-iodo-3-methoxybenzaldehyde which is similarly converted to the acetonitrile by reduction of the aldehyde and conversion of the carbinol group into an acetonitrile group), 4-fluoro-3-methoxyphenyl-acetonitrile (similarly preparable except that fluoroboric acid is used to decompose the diazo), 4-methyl-3-methoxyphenyl-acetonitrile (preparable similarly to the 4-chloro compound from the known benzaldehyde derivative), and 4-trifluoromethyl-3-methoxyphenyl-acetonitrile (preparable from 2-methoxy-4-toluic acid by conversion of the carboxyl to $CF_3$ by reaction with $SF_4$ or antimony pentafluoride, chlorination of the methyl group in UV light, decomposition of the chloromethyl group with hexamethylene-tetramine and water to give the 4-trifluoromethyl-3-methoxybenzaldehyde and conversion of the aldehyde group to the acetonitrile by the same reaction as used for 4-chloro compound), there are obtained 1,1,1-trifluoro-3-(4-chloro, bromo, iodo, fluoro, methyl, and trifluoromethyl-3-methoxyphenyl)-propanones.

Example 7

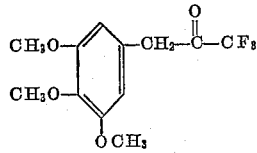

The procedures of Examples 1, 2 and 3 (or the procedures of Examples 1 and 4) are followed using 3,4,5-trimethoxyphenylacetonitrile in place of the dimethoxyphenylacetonitrile, in equivalent quantity. The product is the 3,4,5-trimethoxyphenyltrifluoroacetone of the above structure. The corresponding 2,3,4- and 2,4,5-trimethoxyphenyl isomers are obtained when 2,3,4-trimethoxyphenylacetonitrile and 2,4,5-trimethoxyphenylacetonitrile are used in place of the 3,4,5-trimethoxyphenylacetonitrile.

When the procedure of Example 5 is followed using an equivalent quantity of the 3,4,5-trimethoxyphenyltrifluoroacetone, prepared above in place of the product of Example 3, the corresponding 3-(trimethoxyphenyl)-1,1,1-trifluorobutanone-2 is obtained.

Example 8

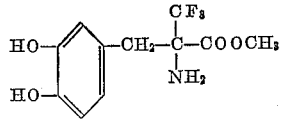

To a slurry of 79 g. of ammonium carbonate and 17.1 g. of potassium cyanide in 105 ml. of water is added 26.5 g. of 3,4-dimethoxyphenyltrifluoroacetone in 105 ml. of ethanol (the product of Example 3). The mixture is stirred at room temperature for 90 hours and at 60° C. for 15 hours. The reaction mixture is then concentrated in vacuo until essentially all ethanol is removed, and the product is extracted with three successive 150 ml. portions of ether. The combined ether extracts are washed twice with 100 ml. portions of water, dried and concentrated in vacuo. The residual product is recrystallized from 50% ethanol.

When the 2,3-dimethoxyphenyl and 2,4-dimethoxyphenyl ketones prepared in Example 3 are used in place of the 3,4-dimethoxyphenyl ketone, the isomeric hydantoins are obtained.

Example 9

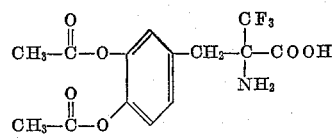

A mixture of 15 g. of the product of Example 8 and 150 ml. of 48% hydrobromic acid are refluxed under nitrogen for 44 hours. The reaction mixture is concentrated in vacuo to an oil. Residual hydrobromic acid is removed by flushing three times with 150 ml. of tertiary butanol. 60 ml. of acetone is then added and the insoluble ammonium bromide is removed by filtration. The acetone filtrate is treated with 2.76 g. of ethylene oxide and the mixture is cooled to 5°. The crude amino acid is filtered and washed three times with 10 ml. of acetone. The grey crystalline crude product is decolorized by dissolving in 10 ml. of water saturated with sulfur dioxide and stirring at room temperature for 15 minutes with 1.3 g. of activated charcoal. After the charcoal is removed by filtration, the colorless filtrate is evaporated to 30 ml. in a stream of nitrogen and then cooled to 5° C. The purified α-trifluoromethyl-3,4-dihydroxyphenylalanine is removed by filtration, washed twice with 5 ml. of ice water and dried.

When the isomeric 2,3-dimethoxyphenyl and 2,4-dimethoxyphenyl hydantoin derivatives prepared in Example 8 are used in place of the 3,4-dimethoxy isomer, the corresponding 2,3-dihydroxyphenyl and 2,4-dihydroxyphenyl-α-trifluoromethyl alanines are obtained.

Example 10

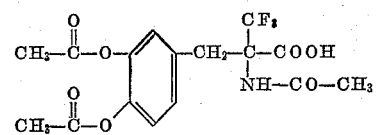

A suspension of 25 g. of the product of Example 9 in 250 ml. of anhydrous methanol is saturated with hydrogen chloride while being held at 10–20° C. The mixture is then refluxed 3 hours after which it is allowed to stand for 18 hours. The solvent is removed and the residue is redissolved in 50 ml. of methanol under nitrogen. The methanol is removed under a vacuum. This addition of methanol is twice repeated. The resulting hydrochloride salt of the methyl ester is then picked up in 50 ml. of water at 50° C. The solution is filtered and the pH of the filtrate is adjusted to 8.5 with concentrated ammonium hydroxide keeping the mixture under nitrogen at 5–10° C. It is then allowed to stand, after which it is filtered. The isolated product is washed three times with 15 ml. of water at 10° C. and then dried in a vacuum.

When ethanol, isopropanol, and butanol are substituted for the methanol in the above procedure, the corresponding ethyl, isopropyl and butyl esters are obtained.

When the 2,3-dihydroxyphenyl and 2,4-dihydroxyphenyltrifluoromethylalanine products of Example 9 are substituted for the 3,4-dihydroxy isomer in any of the above reactions, the corresponding esters are obtained.

Example 11

A solution of 5.73 g. of sodium hydroxide in 10 ml. of water is heated to boil and then cooled to room temperature. To this solution is then added 12.5 g. of the product of Example 9 and 50 g. of ice. To this mixture there is then added with vigorous stirring 11.13 ml. of acetic anhydride. The mixture is stirred at 0° for 1 hour after which the product is isolated by filtration and washed three times with 10 ml. portions of 9:1 isopropyl alcohol water mixture. The product is dissolved in a solution of 100 ml. of isopropanol and 25 ml. of water at the boiling point. The hot solution is filtered and the filtrate is cooled. The crystalline product is separated by filtration, washed and dried. It gives a negative ferric-chloride test indicating the absence of free hydroxyl groups and is the diacetyl derivative.

Similarly, when an equivalent quantity of propionic anhydride or butyric anhydride is substituted for the acetic anhydride in the above procedure, the corresponding propionyloxy and butyryloxy products are obtained.

Example 12

A mixture of 31.5 g. of the product of Example 9, 100 ml. of acetic anhydride and 75 ml. of pyridine is purged thoroughly with nitrogen and then heated under nitrogen to 70° for 2 hours. The mixture is allowed to stand overnight at room temperature and concentrated on a steam bath. The triacetate is isolated by filtration, washed thoroughly with ice water and dried in vacuo over phosphorous pentoxide. It can be recrystallized from aqueous ethanol.

Similarly, when formyl acetic anhydride (J. Org. Chem., 23, 728, 1958) or propionic anhydride are substituted in equivalent amounts for the acetic anhydride in the above procedure, the corresponding formyl or propionyl compounds are obtained.

Example 13

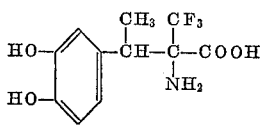

The procedures of Examples 8 and 9 are followed using an equivalent quantity of the product of Example 5 in place of the product of Example 3. The product obtained is α-trifluoromethyl-β-methyl-β-3,4-dihydroxyphenylalanine of the above structure. Similarly, when the homologous ketones prepared in Example 5 are used in equivalent quantities in the procedure of Examples 8 and 9 in place of the product of Example 3, the corresponding β-ethyl, β-propyl and β-butyl homologs are obtained.

When the products of the above paragraph are used in equivalent quantities in place of the product of Example 9 in the procedure of Example 10, the corresponding lower alkyl esters of these acids are obtained. Similarly, when the acids of the above paragraph are used in the procedures of Examples 11 and 12 in equivalent quantities in place of the product of Example 9, the corresponding acyl derivatives are obtained.

Example 14

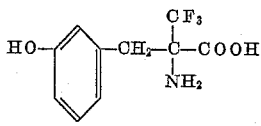

The procedures of Examples 8 and 9 are used substituting an equivalent quantities of the product of Example 6 for the product of Example 3 to yield α-trifluoromethyl-β-3-hydroxyphenylalanine. Similarly, when the higher ketones prepared in Example 6 are substituted for the product of Example 3 in equivalent quantities in the procedures of Examples 8 and 9, the corresponding β-methyl and β-ethyl homologs of this acid are readily obtained. When the 4-chloro, bromo, iodo, fluoro, methyl and trifluoromethyl-3-methoxy methyl ketones also prepared in Example 6 are used in the procedures of Examples 8 and 9 in equivalent quantities in place of the product of Example 3, there are obtained α-trifluoromethyl-β-(4-chloro - 3 - hydroxyphenyl)alanine, α - trifluoromethyl - β- (4 - bromo - 3 - hydroxyphenyl)alanine, α - trifluoromethyl - β - (4 - iodo - 3 - hydroxyphenyl)alanine, α - trifluoromethyl-β-(4-fluoro-3-hydroxyphenyl)alanine and α-trifluoromethyl - β - (4 - trifluoromethyl - 3 - hydroxyphenyl)alanine.

When the acids prepared in the preceding paragraph are used in the procedure of Example 10 in place of the product of Example 9, in equivalent quantities, the corresponding alkyl esters are obtained. Similarly, when the above acids are used in the procedures of Examples 11 and 12 in place of the product of Example 9, in equivalent quantities, the corresponding acyl derivatives are obtained.

Example 15

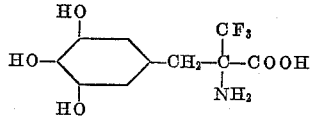

The procedures of Examples 8 and 9 are followed using an equivalent quantity of the product of Example 7 in place of the product of Example 3 to yield α-trifluoromethyl - β - 3,4,5 - trihydroxyphenylalanine. Similarly, when the 2,3,4- and 2,4,5-trimethoxyphenyl ketones described in Example 7 are substituted for the 3,4,5-trimethoxy compound, the corresponding α-trifluoromethyl-β-2,3,4 and 2,4,5-trihydroxyphenylalanines are obtained.

When the homologous higher ketones described in Example 7 are substituted in equivalent quantities for the products of Example 3 in the procedures of Examples 8 and 9, the corresponding β-methyl, β-ethyl and β-propyl derivatives of the α-trifluoromethyl-β-trihydroxyphenylalanine are obtained.

When any of the above acids are substituted in equivalent quantities for the product of Example 9 in the procedure of Example 10, the corresponding methyl, ethyl, propyl and butyl esters are obtained. Similarly, when these acids are substituted in the procedures of Examples 11 and 12, in equivalent quantities, for the product of Example 9 and the quantity of acetic anhydride is increased by 50%, the corresponding acetylated compounds are obtained.

We claim:
1. Compounds of the formula

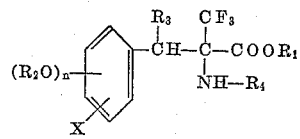

in which $R_1$ and $R_3$ are each selected from the group consisting of hydrogen and lower alkyl, $R_2$ and $R_4$ are each selected from the group consisting of hydrogen and lower alkanoyl, $R_4$ being hydrogen when $R_2$ is hydrogen, $n$ is a positive whole number less than 4, and X is selected from the group consisting of hydrogen, halogen, lower alkyl and trifluoromethyl, X being para to the amino-acid side chain when other than hydrogen.

2. α-Trifluoromethyl-β-3,4-dihydroxyphenylalanine.
3. α-Trifluoromethyl - β - 3,4-dihydroxyphenylalanine ethyl ester.
4. α-Trifluoromethyl - β - 3,4-dihydroxyphenylalanine ethyl ester hydrochloride.
5. α-Trifluoromethyl-β-3,4-diacetoxyphenylalanine.
6. N - acetyl - α - trifluoromethyl-β-3,4-diacetoxyphenylalanine.
7. α-Trifluoromethyl-β-3-hydroxyphenylalanine.
8. α-Trifluoromethyl-β-2,3-dihydroxyphenylalanine.
9. α-Trifluoromethyl-β-3,4,5-trihydroxyphenylalanine.
10. α-Trifluoromethyl-β-2,3,4-trihydroxyphenylalanine.
11. α-Trifluoromethyl-β-2,4,5-trihydroxyphenylalanine.
12. α-Trifluoromethyl-β-methyl-β-3,4 - dihydroxyphenylalanine.

References Cited in the file of this patent
UNITED STATES PATENTS

| | | |
|---|---|---|
| 2,868,818 | Pfister et al. | Jan. 13, 1959 |
| 2,969,372 | Braun et al. | Jan. 24, 1961 |
| 2,969,373 | Loev et al. | Jan. 24, 1961 |

OTHER REFERENCES

Schaaf et al.: Helv. Chim. Acta, vol. 7, pages 357 to 363 (1924).
Szeki et al.: Chem. Abst., vol. 25, page 2986 (1931).
Wagner et al.: "Snythetic Organic Chemistry," pages 481, 482, 466–468 (1953), J. Wiley.
Kaiser et al.: J. Am. Chem. Soc., vol. 79, pages 4365 to 4367 (1957).